United States Patent [19]

Dhingra

[11] 3,907,545

[45] Sept. 23, 1975

[54] STABLE LIQUID AMINE SALTS OF CHLORINATED HERBICIDAL ACIDS

[75] Inventor: Yog R. Dhingra, Midland, Mich.

[73] Assignee: The Dow Chemical Company, Midland, Mich.

[22] Filed: May 2, 1973

[21] Appl. No.: 356,527

[52] U.S. Cl. ............ 71/113; 71/DIG. 1; 260/501.16
[51] Int. Cl. .............................................. A01n 9/24
[58] Field of Search ........................ 71/113, DIG. 1; 260/501.16

[56] References Cited
UNITED STATES PATENTS

| | | |
|---|---|---|
| 2,558,762 | 7/1951 | Kohr, Jr. et al. ................ 71/DIG. 1 |
| 2,689,262 | 9/1954 | Scoles ................................... 71/113 |
| 2,889,663 | 6/1969 | Eaton et al. .......................... 71/113 |
| 3,288,586 | 11/1968 | Littler .................................. 71/113 |
| 3,413,300 | 11/1968 | Haertl ................................. 71/113 |
| 3,539,613 | 11/1970 | Galvin et al. ......................... 71/113 |
| 3,607,215 | 9/1971 | Watanabe ............................ 71/113 |

Primary Examiner—Glennon H. Hollrah
Attorney, Agent, or Firm—Gary D. Street

[57] ABSTRACT

Stable liquid herbicide concentrate compositions comprising the amine salts of chlorinated herbicidal acids in combination with a selected solvent medium which are readily diluted with water to form aqueous compositions suitable for use in herbicide applications.

9 Claims, No Drawings

STABLE LIQUID AMINE SALTS OF CHLORINATED HERBICIDAL ACIDS

BACKGROUND OF THE INVENTION

The present invention relates to novel liquid chlorinated herbicidal acid compositions. More specifically, this invention relates to chemically and physically stable liquid compositions comprising the amine salts of chlorinated herbicidal acids in combination with a selected solvent carrier.

Representative known herbicidal acids include, for example, 2,2-dichloropropionic acid, 2,2,3-trichloropropionic acid, 2,2-dichlorobutyric acid and the like. Such acid materials cause severe topical irritation and, therefore, ordinarily are employed in the form of their simple water-soluble salts, e.g., as the alkali metal, ammonium or amine salts. These salts, particularly sodium 2,2-dichloropropionate, have achieved outstanding commercial success, avoiding the handling problem of the free acids, but they have the disadvantage that in water or in a water-miscible solvent they undergo decomposition. This decomposition occurs at such a rate as to make impractical the use in herbicidal applications of either an aqueous or a water-miscible formulation unless it has been prepared within a short period of time prior to use. In general practice, therefore, the solid sodium, potassium, ammonium, and various amine salts of many of the aforementioned herbicidal acids have been employed as solid concentrate compositions. However, because of the problems associated with transporting large bulk quantities of material, the instability of many solids themselves and the need for weighing and special procedures in formulating such solids for use in liquid applications and the like, such solid herbicidal compositions have been found in commercial use to be less convenient than a liquid concentrate for herbicidal applications.

Additionally, weighing equipment available to numerous users of such solid products is often crude and inaccurate and considerable speculation as to the exact amount employed often results. Precise measurement of the dosage is, however, essential where such products are employed in the presence of desired crops. On the other hand, precise volumetric measurements of a required dosage, thus providing a crop safety factor, readily are afforded by simple, marked containers for liquid compositions.

Attempts to formulate liquid concentrate compositions by mixing together solid salt forms and solvents such as, for example, glycol ethers, have been partially successful in that thick pourable dispersions or suspensions with certain of the salts are formed. However, because suspensions are formed (as opposed to solutions), phase separation as well as crystal growth takes place. Thick sedimentation, which is difficult to redisperse in the suspension, also occurs, thus seriously curtailing the employment of such compositions.

SUMMARY OF THE INVENTION

Single phase liquid compositions of amine salts of herbicidal acids comprising this invention are prepared in situ by adding a predetermined amine reactant to a herbicidal acid in sufficient quantities to neutralize substantially all of the acid present, said addition being carried out in the presence of a selected solvent medium. The resulting liquid herbicidal compositions exhibit good physical and chemical stability for long periods of time under normal as well as extreme temperature conditions.

DESCRIPTION OF PREFERRED EMBODIMENTS

The herbicidal acids employed for the purposes of this invention have heretofore been described. The amine bases employed to form, in situ, the stable liquid acid amine salts include, for example, dimethylamine, monoethanolamine, diethanolamine and the like. Solvent systems suitable for use in preparing the stable liquid compositions include, for example, ethylene glycol, diethylene glycol, propylene glycol, ethylene glycol methyl ether, diethylene glycol methyl ether, ethylene glycol n-butyl ether, propylene glycol methyl ether, methylene chloride, dimethylformamide, 1,1,2-trichloroethane, toluene, xylene, methyl ethyl ketone, glycerine and the like. Preferably, the solvents of lower volatility are employed. A preferred class of solvents includes ethylene glycol, propylene glycol and glycerine. An additional preferred class of solvents includes ethylene glycol and propylene glycol. A preferred solvent is propylene glycol. Dimethylamine is a preferred amine reactant. A preferred herbicidal acid is 2,2-dichloropropionic acid.

The effectiveness of the liquid herbicide compositions of the present invention is presently described in terms of the stability or resistance to change of the herbicidal acid over a period of time. The term "stability", as used herein, refers to both the chemical and physical properties of the herbicidal acids in liquid compositions. Physical change refers to the change in physical properties, e.g., phase separation, sedimentation, and crystal growth. Chemical change refers to the degradation of the herbicidal acid into other products.

The compositions of the present invention are prepared in situ by adding the desired amine reactant to the selected herbicidal acid in the presence of a selected solvent medium. Usually, the addition of the amine reactant is initiated into the solvent medium prior, e.g., from about 2 to about 5 minutes, to the addition of the appropriate amount of the desired herbicidal acid to the solvent. The temperature of the reaction mixture is maintained at temperatures of from about 20° to about 60°C. during the course of the amination reaction. The addition of the amine reactant, sparging of the gaseous reactants through the reaction mixture and dropwise addition of the liquid reactants with agitation, is continued until the theoretical amount of amine reactant necessary to neutralize the quantity of herbicidal acid present has been added. The resulting reaction mixture is analyzed for free acid by titration using methyl red indicatior. Additional amine reactant is added, if necessary, until the reaction mixture has a pH of from about 6.5 to about 7.5. While the resulting composition can be slightly acidic, it is desirable that the compositions be neutral or only slightly basic, excess amine being present in the composition on a weight percent basis of less than about one percent, preferably less than about one-half percent.

Generally, sufficient quantities of the selected herbicidal acid are employed to achieve an acid equivalent per gallon of composition of from about 2 to about 7 pounds. Preferably, sufficient quantities of herbicidal acid to achieve an acid equivalent of from about 4 to about 6 pounds per gallon of composition are employed. Sufficient quantities of a solvent or mixtures thereof are employed to maintain a concentration thereof in the finished composition of from about 10 to about 50 percent by weight.

As indicated hereinbefore, the compositions of the present invention are characterized by their good physical stability upon prolonged storage, especially at the high temperatures, e.g., from about 100° to about 140°F., often encountered during storage in warm or hot climates. These compositions also possess good chemical stability. The compositions of the present invention are also characterized by their ability to remain liquid and pourable at low temperatures, e.g., temperatures ranging from about 50°F. to as low as about 40°F. Such compositions are thus adapted to be employed for early seasonal use in climates where such temperature ranges are often encountered. Additionally, the compositions of the present invention are readily and easily diluted with water to form a uniform treating composition employed in the control of undesired vegetation. Such physical stability is quite surprising in view of applicant's discovery that attempts to prepare similar liquid compositions employing ammonia resulted in physically unstable products. In such attempts, it was found that excess amounts of ammonia above the theoretical amount needed were required in order to obtain the desirable pourable liquid product; the use of excess ammonia was found, however, to attribute to the physical instability of the prepared product. Similar attempts employing monomethyl- and triethyl- amine reactants also resulted in physically unstable compositions.

The herbicidal acids employed in the present invention are available in varying grades of purity up to 99 percent and higher. However, grades of lesser purity, such as grades from about 80 to about 99 percent, are readily available and can be employed to obtain the liquid compositions of the present invention. Use of the purer, acid materials minimize or even eliminates the formation of precipitates caused by the presence of by-product acid chloride materials and the like in the impure or crude acids. The employment of the purer acid materials, although not critical, thus is preferred in the practice of the present invention.

As with the parent acids and their known salts, the liquid compositions of the present invention are useful for the ocntrol of plant growth. Accordingly, the unmodified concentrate compositions of the present invention are adapted to be diluted with one or a plurality of carriers such as water, petroleum distillates, or other liquid carriers and cooperating substances, such as surface-active agents and the like to prepare treating compositions for herbicidal applications. The active ingredient usually makes up from about 0.5 to about 50 percent or more of these diluted formulations.

In order that the invention can be better understood, the following examples are given.

EXAMPLE 1

2,2-Dichloropropionic acid (313 grams; 88% purity) and propylene glycol (52 grams) initially at room temperature, i.e. about 18–20°C. were placed in a 500 milliliter (ml) flask fitted with an agitator, sparger, thermometer and vent tube. Admixing of the acid and solvent increased the temperature about 5°–10°C. Dimethylamine gas, at a rate 1.5 grams/minute, was sparged into the above mixture. During the amine addition, the temperature of the reaction mixture was maintained within a temperature range of from about 40° to about 60°C. by cooling the reaction mixture with the aid of a water bath. After the theoretical amount (98 grams) of amine reactant had been added (determined by measuring the weight loss in the gas supply cylinder), the amine flow was stopped and the presence of any free acid in the reaction mixture checked by acid-base titration using methyl red indicator. Small additional amounts of amine were added until the reaction mixture was indicated to be only slightly acidic, i.e., at a pH of about 6.5. The composition obtained as a result of these operations was a clear liquid and the formation of the dimethylamine salts of 2,2-dichloropropionic acid was confirmed by infrared analysis.

Liquid compositions of the dimethyl- and monoethanol-amine salts with various amounts of 2,2-dichloropropionic acid, 2,2,3-trichloropropionic acid and 2,2-dichlorobutyric acid are similarly prepared by employing the appropriate amine and acid reactant materials and a selected solvent medium and utilizing procedures analogous to those set forth in Example 1 above.

The following data, obtained with typical compositions under consideration, exemplifies the present invention and illustrates the benefits to be derived therefrom. The data set forth in Table I below illustrates the superior physical stability characteristics of various prepared compositions of the present invention, i.e., dimethylamine and monoethanol amine salt formulations (Runs 1–4) of 2,2-dichloropropionic acid, as compared with control compositions (Runs 5–11) of 2,2-dichloropropionic acid with ammonia and monoethyl- or triethyl- amines. The concentration of the active acid material is expressed as pounds of acid equivalent (a.e.) per gallon of composition.

Table I

| Run No. | Formulation Amine | Solvent | Conc. lb. a.e./gal | Shelf Life (Days Before Crystal Formation) | | | |
|---|---|---|---|---|---|---|---|
| | | | | 80°F. | 100°F. | 122 | 140 |
| 1. | Dimethyl | Propylene glycol | 6.1 | (a) | (a) | (a) | (a) |
| 2. | Monoethanol | " | 6.2 | (a) | (a) | (a) | (a) |
| 3. | Dimethyl | Ethylene glycol | 6.1 | (a) | (a) | (a) | (a) |
| 4. | Dimethyl | Propylene glycol methyl ether | 5.8 | (a) | (a) | (a) | (a) |
| Controls | | | | | | | |
| 5. | Monomethyl | Propylene glycol | 6.0 | (a) | (a) | (a) | 20 |
| 6. | Ammonia(b) | " | 6.0 | 50 | 6 | — | — |
| 7 | Monomethyl | Ethylene glycol | 6.3 | (a) | (a) | 33 | 12 |
| 8 | Ammonia(b) | " | 6.0 | 100 | 12 | — | — |
| 9. | Triethyl | " | 4.0 | (a) | 26 | 12 | 8 |
| 10. | Monomethyl | Propylene glycol methyl ether | 6.1 | (a) | (a) | 28 | 12 |
| 11. | Ammonia(b) | " | 6.0 | 6 | 1 | — | — |

(a) No crystal formation after 3 months
(b) ~3% excess ammonia by weight

The compositions of the present invention also possess low melting points desirable for use in cool climates. The data presented in the following Table II exemplifies the superior melting point properties of various typical compositions of the present invention. Melting points were obtained by first freezing the formulations to a solid mass and then placing the frozen formulations into a container heated at 40°F. for a period of two hours. Those samples not entirely melted after this period were placed in progressively warmer boxes for like periods of time until the sample was melted.

TABLE II

Melting Point Properties of Dimethyl Amine Salts of 2,2-Dichloropropionic Acid in Various Solvent Mediums

| Solvent | Conc. lbs. a.e./gal. | % Melted 40°F. | % Melted 50°F. |
|---|---|---|---|
| Propylene glycol | 5.25 | 90 | 100 |
| Propylene glycol | 5.5 | 5 | 100 |
| Propylene glycol | 5.75 | ~2 | 100 |
| Ethylene glycol | 5.5 | 100 | |
| Ethylene glycol | 5.75 | 80 | 100 |
| Ethylene glycol | 6.0 | 0 | 98 |
| Methylene chloride | 5.25 | 100 | |
| Methylene chloride | 5.5 | 100 | |
| Methylene chloride | 5.75 | <2 | 100 |
| Methanol | 5.5 | 100 | |
| Methanol | 5.75 | 100 | |
| Methanol | 6.0 | 100 | |
| Glycerine | 5.5 | 100 | |
| Toluene | 5.5 | | 100 |
| Xylene | 5.5 | | 100 |
| Methyl ethyl ketone | 5.5 | | 100 |
| Dimethyl formamide | 5.5 | 70 | 100 |
| n-Butyl ether | 5.5 | | 100 |

By way of comparison, separate compositions containing monomethyl amine with 2,2-dichloropropionic acid at an acid equivalent of 6.0, 6.1 and 6.3 pounds per gallon, respectively, in a propylene glycol, propylene glycol methyl ether and ethylene glycol, respectively, all possessed melting points of 80°F.

The chemical stability of the liquid compositions of the present invention is exemplified by the storage life of typical compositions of the present invention containing the dimethylamine salts of 2,2-dichloropropionic acid in various solvents. Such chemical stability is illustrated in the following Table III, wherein the storage life for a decomposition in the acid content of a given composition of 10 (t 1/10) and 20 percent (t 1/5), respectively, at various temperatures is set forth:

Table III

| Solvent | Acid Assay Wt. % | Shelf Life (Days) t 1/10 100°F. | t 1/10 122°F. | t 1/5 100°F. | t 1/5 122°F. |
|---|---|---|---|---|---|
| 1. Propylene glycol | 60.94 | 200 | 60 | 420 | 120 |
| 2. Ethylene glycol | 59.53 | 90 | 40 | 190 | 80 |
| 3. Propylene glycol methyl ether | 59.77 | 110 | 40 | 252 | 85 |

The compositions of the present invention, when diluted with water or other solvent carriers and applied to undesired vegetation, have been found to possess herbicidal activity equivalent to that possessed by the parent acids in the forms ordinarily employed. All of the various herbicidal acids, amine reactants and solvent mediums employed herein are commercially available.

What is claimed is:

1. A stable liquid herbicide composition comprising in combination (a) dimethylamine, (b) from about 2 to about 7 pounds acid equivalent per gallon of a chlorinated herbicidal lower alkanoic acid, and (c) from about 10 to about 50 percent by weight of a solvent medium selected from the group consisting of ethylene glycol, diethylene glycol, propylene glycol, ethylene glycol methyl ether, diethylene glycol methyl ether, ethylene glycol n-butyl ether, propylene glycol methyl ether, methylene chloride, 1,1,2-trichloroethane, n-butyl ether, dimethylformamide, toluene, xylene, methylethyl ketone and glycerine, said amine being present in sufficient amounts to neutralize substantially all of the herbicidal acid present.

2. The composition defined in claim 1 wherein the herbicidal acid is selected from the group consisting of 2,2-dichloropropionic acid 2,2,3-trichloropropionic acid and 2,2-dichlorobutyric acid or mixtures thereof.

3. The composition defined in claim 1 wherein the solvent medium is selected from the group consisting of ethylene glycol, propylene glycol and glycerine.

4. The composition as defined in claim 1 wherein the herbicidal acid is 2,2-dichloropropionic acid.

5. The composition as defined in claim 1 wherein the solvent medium is selected from the group consisting of ethylene glycol and propylene glycol.

6. The composition as defined in claim 1 wherein the solvent medium is propylene glycol.

7. The composition as defined in claim 1 wherein the solvent medium is ethylene glycol.

8. The composition as defined in claim 1 containing a herbicidal acid equivalent of from about 4.0 to about 6.0 pounds per gallon of composition.

9. The composition defined in claim 1 wherein the amine is dimethylamine, the chlorinated herbicidal acid is 2,2-dichloropropionic acid and the solvent medium is propylene glycol.

* * * * *